Figure 1:
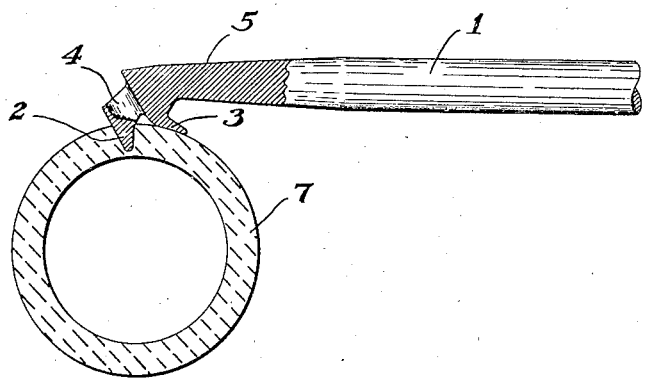

Oct. 24, 1944.  F. P. KILGOUR  2,360,950
WELDING PLASTIC MATERIAL AND DEVICE THEREFOR
Filed Feb. 15, 1943

INVENTOR.
FREDERICK P. KILGOUR
BY
ATTORNEY.

Patented Oct. 24, 1944

2,360,950

UNITED STATES PATENT OFFICE 2,360,950

WELDING PLASTIC MATERIAL AND DEVICE THEREFOR

Frederick P. Kilgour, Niagara Falls, N. Y., assignor to E. I. du Pont de Nemours & Company, Wilmington, Del., a corporation of Delaware Application February 15, 1943, Serial No. 475,941

4 Claims. (Cl. 154—42)

This invention relates to welding thermoplastic materials.

A number of synthetic resinous materials which are thermoplastic are useful for various structural purposes. Illustrative of such thermoplastic materials are the polymers and copolymers of vinylidene chloride, usually plasticized and sometimes containing fillers, sold by the Dow Chemical Company under the trade-mark "Saran." It is desirable to join various articles made of such materials by welding operations, taking advantage of their thermoplastic properties. For example, piping made of thermoplastic synthetic resins is widely useful in the chemical industry and elsewhere for handling corrosive liquids and for other purposes, and an inexpensive, simple method for joining lengths of such thermoplastic pipes is desirable. The common method in current use consists in placing the two ends of the pipe to be joined on a heated surface until the desired softening of the thermoplastic materials has taken place and then forcing the softened ends together and holding them in position until the joint has hardened. While this method has the advantage of rapidity and simplicity of operation, does not require the use of special tools and, when properly used, produces good welds, nevertheless, it has certain disadvantages. For example, it is not applicable to joining pipes which are large and unwieldy to handle manually or which, when set up in position for welding, cannot be readily moved to force the ends together. Another objection is that the softened ends must be forced together accurately since often the thermoplastic material is of such nature that it hardens very quickly (which is the case with "Saran") and if an error is made in bringing the parts into alignment this cannot be corrected, but the imperfectly welded parts must be separated and the procedure repeated. When a good weld is made, the pressure used to force the parts together usually causes the material to flow, forming ridges at the joint. Such ridges on the inside of pipe welds tend to obstruct flow of fluid through the pipes. This method also is satisfactory only for welding together parts having straight parallel surfaces at the point where the weld is to be made and for that reason cannot be used, for example, for successfully mending broken parts.

An object of the present invention is to devise a novel and improved method for welding parts made of thermoplastic materials. A further object is to provide a novel welding tool by means of which thermoplastic materials may be rapidly and satisfactorily welded together. A further object is to weld thermoplastic piping so as to provide a smooth surface at the weld in the interior of the pipe without formation of ridges and similar imperfections. Another object is to provide a device and method for repairing broken thermoplastic articles by welding broken joints, filling holes, and the like, by welding them with thermoplastic materials. Still other objects will be apparent from the following description.

Figure 2:
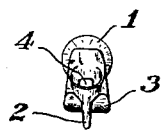
Figure 3:
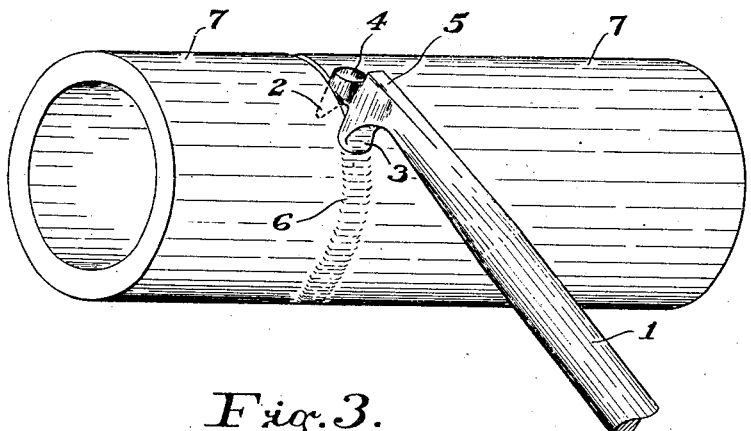

In the drawing, Figure 1 is a partly cross sectional view of my novel tool for welding thermoplastic materials showing its application in welding a thermoplastic pipe. Figure 2 is a front elevation of the tool shown in Figure 1. Figure 3 is a perspective view showing the application of the tool of Figure 1 in welding together two lengths of thermoplastic pipe.

My novel welding tool may be made of any suitable heat conductive metal and may be heated by any suitable means. Methods commonly used for heating soldering irons are suitable for heating my welding tool. Preferably I construct the tool of copper or a copper alloy which has high heat conductive properties and apply heat continuously during the operation of the tool, for example, by the application of electrical heat as commonly applied in electric soldering irons.

Referring to the drawing, the welding tool of the present invention consists of a shank 1 which terminates in a welding tip 2. Tip 2 is beak-shaped and points in a direction substantially at right angles to the axis of shank 1. Directly to the rear of tip 2 and formed integrally with shank 1 is located spreading member 3 which has a relatively flat undersurface and is adapted to spread and otherwise work plastic material which is softened by the heating action of tip 2 as well as material which is softened by its own heating action. In the upper part of tip 2 I provide a funnel-shaped opening 4 which opens into a point between tip 2 and spreading member 3 and which serves for the introduction of additional thermoplastic material into the weld. This opening is not essential for all purposes to which the tool may be put, but it is advantageous in order to readily feed additional thermoplastic material to the weld to fill openings, especially openings which have a width substantially greater than that of the welding tip 2. Therefore, I generally prefer to provide the tool with an opening as above-described. I have found that this opening may be made relatively wide so as to facilitate the rapid introduction of materials in the weld without appreciable sacrifice of the heating properties of the welding tip 2, in spite of the fact that considerable heat conductive material must be removed to provide such an opening which leaves a relatively small amount of material to carry heat to the welding tip and forms a substantial cooling surface.

The drawings illustrate the operation of my welding tool in joining together the ends of two pipes 1 made of thermoplastic material. In making such joint I preferably first clamp the pipe lengths in rigid position with their ends close together or in contact. By this means the pipe may be brought into perfect alignment before the welding operation is commenced. I then apply the heated welding tool, forcing the welding tip into the crevice to be welded, preferably so that the end of the tip extends almost to the bottom of the crevice, substantially in the position shown by Figures 1 and 3 of the drawing. It will be noted that in this position the spreading member 3 will come in contact with the exterior surface of the weld. The tool then is moved along through the joint at a speed sufficiently slow to insure thorough softening of the material to be welded. The welding tip 2 thoroughly softens or melts the material throughout the entire thickness of the joint and, as the tool is moved forward, the softened material tends to flow together behind the tip. The action of the spreading member 3 following the tip, however, is essential to complete the weld. In addition to its function of forming a relatively smooth exterior surface in the weld, the primary purpose of spreading member 3 is to force softened material down into the crevice so as to complete the weld and fill any voids. In this way, spreading member 3 acts as a trowel to completely fill the crevice with softened thermoplastic material and thus produce a homogeneous strong weld free from any defects such as cracks or other incompletely filled voids.

When the edges of the parts to be welded are not sufficiently smooth and parallel, but have irregular shape, or here and there form a relatively wide crevice, it may be necessary to add additional thermoplastic material in order to completely fill the weld. This situation is commonly encountered, for example, in mending broken pipes or in repairing holes or filling small openings by welding. In such event, I may apply additional welding material during the welding operation through the funnel-shaped opening 4. A convenient method is to utilize a small rod of thermoplastic material for this purpose. By inserting the rod through the opening 4, the end of the rod is softened and a slight pressure or reciprocal motion of the rod will readily force into the weld any desired amount of material. By moving the welding tool forward, the spreading member 3 works material thus added to the weld through opening 4, forcing it into the weld and smoothing out the exterior of the weld.

The action of the spreader member 3 ordinarily results in welding bead 6, as illustrated in Figure 3 of the drawing, which is somewhat similar in appearance to the bead formed in metal welding. If it is desired to have a substantially smooth surface at the site of the weld, I have found that this can readily be accomplished by smoothing the bead out by application of a heated tool having a smooth flat surface. For this purpose I generally prefer to provide such a smooth flat surface 5 on the upper side of my welding tool.

The herein described method and welding tool have numerous advantages over methods used heretofore for welding thermoplastic materials. The tool is simple and easy to operate and requires little skill to handle. With its use I have found that an operator can learn to do perfect welds of all kinds after no more than a few hours of instruction. My invention is adapted to welding together plastic materials of various shapes and sizes, and mending breaks and filling holes. By its use complicated pipe installations and other structures made of thermoplastic materials may be accomplished quickly and economically. It is equally well adapted for welding large and small parts; for example, 1 inch and 12 inch diameter pipes. It is especially useful for installing systems of thermoplastic piping since the piping may be set into place in any desired position and then the joints may be welded while in that position without changing position provided, of course, that sufficient clearance is provided for operating the tool. However, by devices apparent to the skilled mechanic, the tool is adapted for operating within very narrow clearances, for example, by providing a suitably bent shank.

As an illustration of the utility of my invention, I have welded parts of 2 inch diameter "Saran" piping in various ways. A weld made as illustrated in Figure 3 of the drawing was readily made and the interior of the pipe at the weld was smooth and free from ridges or similar surface imperfections. I have joined broken pieces with the same results. I have found it easy to weld pipe lengths to form various angles, for example, to make elbows, T's, and the like. In all cases I have experienced no difficulty in producing perfect welds. If any imperfection occurs such as a small leak, it may be easily repaired by reapplication of the welding tool without disturbing the rest of the weld. I have found that persons having a modicum of skill in handling common hand tools can easily and rapidly learn to practice my invention, which requires much less skill than for welding metals.

While I have described and illustrated a preferred form of my welding tool, the invention is not restricted to that particular form. For example, the shape and size of the welding tip may be varied to adapt the toll for different types of welding operations. The same is true of the spreading member 3. Also, the angles of the welding tip and the spreading member with respect to each other and with respect to the axis of the shank may be varied in a manner apparent to the skilled workman for adapting the tool to various welding operations. If desired, heat may be applied separately to the welding tip and the spreading member so that each may be held at a different temperature during the operation. For many welding operations an opening for the introduction of welding material such as opening 4 shown in the drawing is not essential and may be omitted, in which case, the welding material may be added if desired by some other means, for example, by inserting a rod of material from the side. Also the shape and position of the opening for introducing welding material may be varied in a number of ways as will be apparent to the skilled operator. Further, the opening for introduction of welding material may be provided with a suitable hopper or container for holding such material in powdered or molten form, and also, if desired, it may be provided with conventional means for feeding material from such hopper or container to the weld in controlled amounts. However, for most purposes, I prefer to use a construction substantially as shown in the drawing as being the most adaptable for general use.

While I have described my invention with respect to its utility for welding parts made of "Saran" it is likewise useful for joining various other kinds of thermoplastic materials, including the various thermoplastic synthetic resins and compositions made of such resins containing added materials such as plasticizers, fillers, etc. The degree of heat applied to the welding tool will depend on the softening or melting point of the thermoplastic material, which generally is well-known or can readily be determined.

I claim:

1. A heat conductive tool for welding thermoplastic organic materials which comprises a metal tip adapted to conduct heat to the site of welding and a spreading member adjacent to said tip, said member being adapted to spread and force into the weld material softened by the heating action of said tip.

2. A heat conductive tool for welding thermoplastic organic materials which comprises a shank of heat conducting metal terminating in a relatively narrow welding tip and a spreading member located adjacent to and in fixed relationship to said tip, said member being adapted to spread material softened by the heating action of said tip and to force the softened material into any groove or crevice existing behind said tip when the latter is moved forward.

3. A heat conductive tool for welding thermoplastic organic materials which comprises a shank of heat conducting metal terminating in a relatively narrow welding tip directed at an angle to the axis of said shank and a flat spreading member substantially wider than said tip, formed integrally with said shank to the rear of said tip and adapted to spread material softened by the heating action of said tip.

4. A heat conductive tool for welding thermoplastic organic materials which comprises a shank of heat conducting metal terminating in a relatively narrow welding tip directed substantially at right angles to the axis of said shank, a heat conductive, relatively flat spreading member formed integrally with said shank adjacent to and rearward of said tip and extending in a rearward direction, said spreading member being substantially wider than said tip.

FREDERICK P. KILGOUR.